(12) United States Patent
Vasa et al.

(10) Patent No.: US 8,040,921 B2
(45) Date of Patent: Oct. 18, 2011

(54) METHOD AND APPARATUS FOR CONTROLLING THE TRANSFER OF PRIVATE INFORMATION IN A COMMUNICATION SYSTEM

(75) Inventors: Yojak Harshad Vasa, Cary, NC (US); Anthony J. Sammarco, Raleigh, NC (US); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 559 days.

(21) Appl. No.: 11/969,285

(22) Filed: Jan. 4, 2008

(65) Prior Publication Data
US 2008/0313080 A1    Dec. 18, 2008

Related U.S. Application Data (60) Provisional application No. 60/944,371, filed on Jun. 15, 2007.

(51) Int. Cl.
*H04J 1/02* (2006.01)

(52) U.S. Cl. ........................................ 370/497; 370/487

(58) Field of Classification Search .................. 370/230, 370/352, 335, 487, 497; 709/203, 217, 223, 709/246, 204, 335, 245, 203.204; 726/11, 726/15; 705/10, 37, 65, 75, 80, 1; 380/270; 455/426.1, 456.2; 340/7.21
See application file for complete search history.

(56) References Cited

U.S. PATENT DOCUMENTS

| | | | |
|---|---|---|---|
| 5,950,137 A * | 9/1999 | Kim ........................... | 455/456.2 |
| 6,795,924 B1 * | 9/2004 | Kiessling et al. ............... | 726/30 |
| 6,894,994 B1 * | 5/2005 | Grob et al. .................... | 370/335 |
| 6,922,721 B1 | 7/2005 | Minborg | |
| 6,977,909 B2 | 12/2005 | Minborg | |
| 6,996,072 B1 | 2/2006 | Minborg | |
| 7,269,428 B1 * | 9/2007 | Wallenius et al. ......... | 455/456.2 |
| 2001/0029522 A1 * | 10/2001 | Yoshimine et al. ........... | 709/203 |
| 2002/0032597 A1 * | 3/2002 | Chanos ......................... | 705/10 |
| 2002/0057803 A1 * | 5/2002 | Loos et al. .................... | 380/270 |
| 2002/0084888 A1 * | 7/2002 | Jin ................................ | 340/7.21 |
| 2002/0124113 A1 * | 9/2002 | Gargya et al. ................. | 709/246 |
| 2002/0138650 A1 * | 9/2002 | Yamamoto et al. ........... | 709/245 |

(Continued)

FOREIGN PATENT DOCUMENTS

WO    WO0291663 A1 *    5/2002

(Continued)

OTHER PUBLICATIONS

PCT—International Search Report dated Aug. 6, 2008, for Application No. PCT/US2008/057001, Filed Mar. 14, 2008.

*Primary Examiner* — Andrew Lai
(74) *Attorney, Agent, or Firm* — Coats & Bennett, P.L.L.C.

(57) ABSTRACT

Methods and systems for selectively transferring confidential or private information to a user of a communication device are disclosed. In an exemplary method, a trigger event is detected at a first communication device, resulting in the retrieval of a data object for transmission to a second communication device. If the data object includes private or confidential information, consent of a user of the first communication device is required before the data object may be sent to the second communication device. In some embodiments, consent is obtained by explicitly requesting consent from a user. In others, consent may be deemed under pre-determined circumstances.

15 Claims, 5 Drawing Sheets

U.S. PATENT DOCUMENTS

| | | | |
|---|---|---|---|
| 2002/0156646 A1* | 10/2002 | Kaiwa et al. | 705/1 |
| 2002/0183052 A1 | 12/2002 | Tachikawa | |
| 2003/0097594 A1* | 5/2003 | Penders | 713/201 |
| 2003/0181205 A1* | 9/2003 | Yiu et al. | 455/426.1 |
| 2003/0195858 A1* | 10/2003 | Watanabe et al. | 705/75 |
| 2004/0122895 A1* | 6/2004 | Gourraud | 709/204 |
| 2005/0271041 A1 | 12/2005 | Minborg | |
| 2006/0114845 A1 | 6/2006 | Minborg | |
| 2006/0165069 A1* | 7/2006 | Maurice | 370/352 |

FOREIGN PATENT DOCUMENTS

| | | | |
|---|---|---|---|
| WO | WO03030571 A1 * | 10/2002 | |
| WO | 02/091663 A1 | 11/2002 | |
| WO | 03/030571 A1 | 4/2003 | |

\* cited by examiner

METHOD AND APPARATUS FOR CONTROLLING THE TRANSFER OF PRIVATE INFORMATION IN A COMMUNICATION SYSTEM

RELATED APPLICATIONS

The present application claims priority under 35 U.S.C. Section 119(e) to provisional application Ser. No. 60/944,371, filed Jun. 15, 2007, the contents of which are incorporated by reference herein.

BACKGROUND

The present invention relates generally to communication systems. More specifically, the invention relates to the transfer of data objects to communication devices in a communication system.

With the convergence of voice and data communication networks, portable communication devices are increasingly likely to support several communication modes, as well as a number of communication-related applications. Single-purpose cellular phones and alphanumeric pagers have given way to complex mobile devices supporting voice communications, e-mail, and instant messaging. A typical device often includes a camera, a music player, and sound recorder, and may include a global positioning system (GPS) receiver. Many of these devices and their supporting wireless networks now enable simultaneous use of multiple communication modes. Thus, a device user today might engage in a voice call and simultaneously send or receive text messages, digital images, video clips, or the like.

A few applications have been developed to take advantage of this simultaneous availability of multiple communications modes. In particular, several patents and patent application publications describe a so-called Phone Pages system, in which the generation and transfer of multimedia data objects is triggered by various communication-related events. These data objects, or Phone Pages, thus supplement a primary communication session, such as a voice call, an e-mail exchange, or an instant message conversation. The Phone Pages concept is described in the following patents and patent application publications, the contents of which are each incorporated by reference herein: U.S. Pat. No. 6,922,721, titled "Exchange of Information in a Communication System" and issued on Jul. 26, 2005 to Minborg et al.; U.S. Patent Application Publication 2005/0271041 A1, titled "Exchange of Information in a Communication System" and filed on Jun. 1, 2005 by Minborg et al.; U.S. Pat. No. 6,996,072, titled "Method and Apparatus for Exchange of Information in a Communication Network" and issued on Feb. 7, 2006 to Minborg; U.S. Pat. No. 6,977,909, titled "System and Method for Exchange of Information in a Communication Network" and issued on Dec. 20, 2005 to Minborg; and U.S. Patent Application Publication 2006/0114845, also titled "System and Method for Exchange of Information in a Communication network" and filed on Nov. 14, 2005 by Minborg.

The communication techniques and systems described in the preceding references provide a variety of enhancements to conventional modes of communication, facilitating the convenient exchange of various data objects between users of communications devices. These enhancements may be quite valuable both for promoting personal relationships and for supporting business and enterprise communications. However, techniques for controlling the transfer of private information are needed.

SUMMARY

Methods and apparatus for controlling the exchange of private and/or confidential information in a communication network are disclosed. In an exemplary method, the occurrence of a trigger event at a first communication device is detected; the trigger event may be related to communications between the first communication device and a second communication device. A data object is retrieved or formed, in response to the trigger event, and the data object is evaluated to determine whether it includes private or confidential information. If the data object comprises private or confidential information, the data object is transferred to the second communication device subject to a determination that a user of the first communication device has consented to the transfer. In some embodiments, consent is determined by evaluating a response to an express query. In other embodiments, consent may be deemed according to one or more prior actions by the user, a prior sequence of events, and/or a pre-determined consent profile for the user of the first communication device.

In some embodiments, the methods described herein may be implemented at a mobile terminal; in others, the methods may be implemented at a data object server. Retrieving a data object may comprise, in some embodiments, requesting the data object from a data object server and receiving the data object in response to the request.

Embodiments of a communication device configured to selectively transfer confidential or private information to another communication device are also disclosed, as are embodiments of a data object server in accordance with several aspects of the invention. Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention is described below in reference to a wireless telecommunications system providing voice and data services to a mobile device. Various systems providing voice and data services have been deployed, such as GSM networks (providing circuit-switched communications) and GPRS (providing packet-switched communications); still others are currently under development. These systems may employ any or several of a number of wireless access technologies, such as Time Division Multiple Access (TDMA), Code Division Multiple Access (CDMA), Frequency Division Multiple Access (FDA), Orthogonal Frequency Division Multiple Access (OFDMA), Time Division Duplex (TDD), and Frequency Division Duplex (FDD). The present invention is not limited to any specific type of wireless communications network or access technology. Indeed, those skilled in the art will appreciate that the network configurations discussed herein are only illustrative. The inventive techniques disclosed herein may be applied to "wired" devices accessing conventional voice or data networks, as well as wireless devices. The invention may be practiced with devices accessing voice and/or data networks via wireless local area networks (WLANs) or via one or more of the emerging wide-area wireless data networks, such as those under development by the $3^{rd}$-Generation Partnership Project (3GPP).

Figure 1:
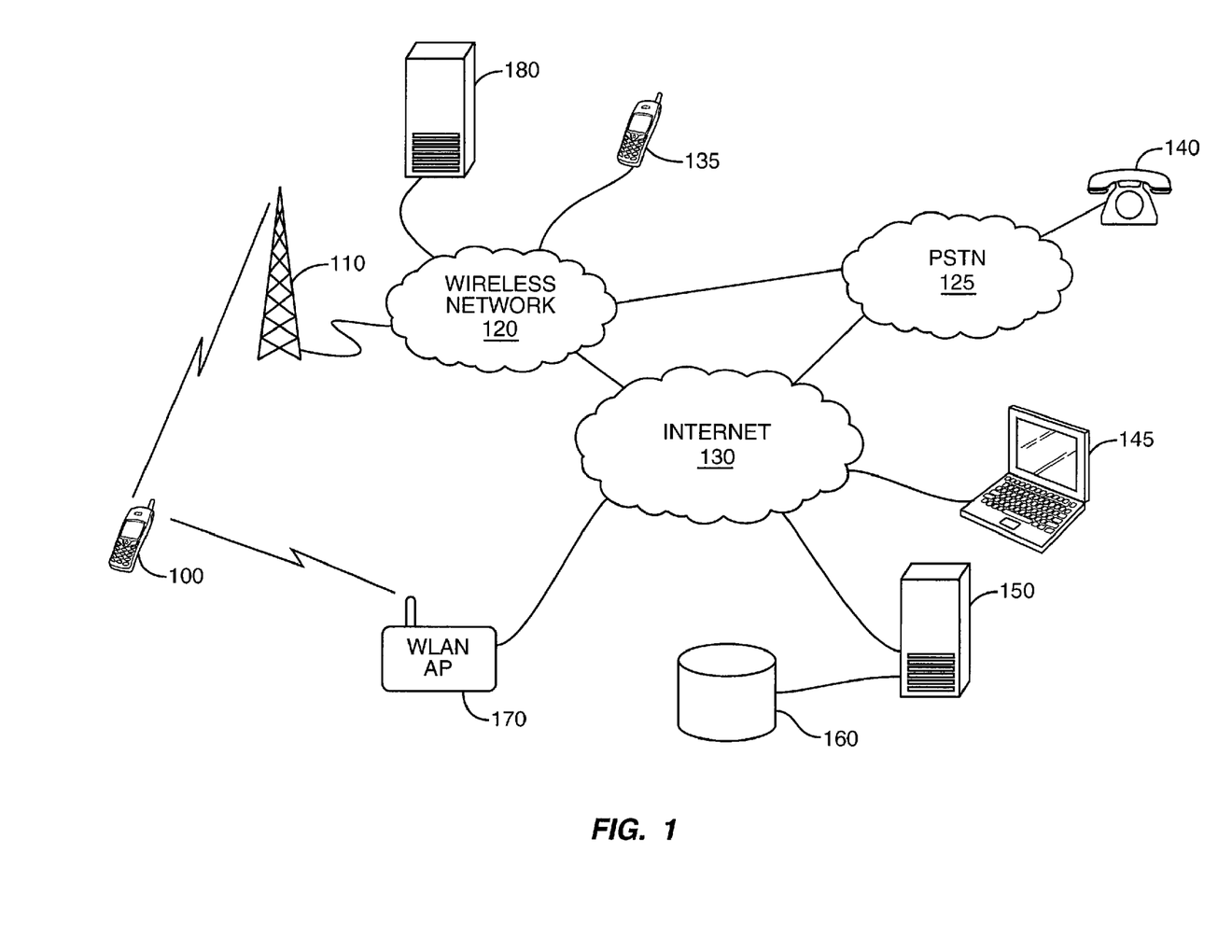
FIG. 1 illustrates a communication system according to one or more embodiments of the present invention.

FIG. 1 illustrates an exemplary communications system in which the present invention may be employed. Communications device 100 communicates with other devices through base station 110, which is connected to wireless network 120. Wireless network 120 is in turn connected to the Public Switched Telephone Network (PSTN) 125 and the Internet 130. Wireless device 100 can thus communicate with various other devices, such as wireless device 135, conventional landline telephone 140, or personal computer 145. In FIG. 1, wireless device 100 also has access to data server 150 via the Internet 130; data server 150 may be configured to provide access through Internet 130 to data or applications stored in storage device 160. Storage device 160 may comprise one or more of a variety of data storage devices, such as disk drives connected to data server 150 or one or more other servers, a Redundant Array of Inexpensive Drives (RAID) system, or the like.

Communications device 100 may be a cordless telephone, cellular telephone, personal digital assistant (PDA), communicator, computer device, or the like, and may be compatible with any of a variety of communications standards, such as the Global System for Mobile Communications (GSM) or one or more of the standards promulgated by 3GPP. Communications device 100 may include a digital camera, for still and video images, as well as a digital sound recorder and digital music player application. Communications device 100 may also support various applications in addition to voice communications, such as e-mail, text messaging, picture messaging, instant messaging, video conferencing, web browsing, and the like.

Communications device 100 also includes a wireless local-area network (WLAN) transceiver configured for communication with WLAN access point 170. WLAN access point 170 is also connected to Internet 130, providing communications device 100 with alternative connectivity to Internet-based resources such as data server 150.

Also connected to wireless network 120 is location server 180. Location server 180 is typically maintained by the operator of wireless network 120, but may be separately administered. The main function of location server 180 is to determine the geographic location of mobile terminals (such as mobile terminal 100) using the wireless network 120. Location information obtained by location server 180 may range from information identifying the cell currently serving mobile terminal 100 to more precise location information obtained using Global Positioning System (GPS) technology.

Other technologies, including triangulation methods exploiting signals transmitted from or received at several base stations, may also be used to obtain location information. Triangulation techniques may include Time Difference of Arrival (TDOA) technology, which utilizes measurements of a mobile's uplink signal at several base stations, or Enhanced-Observed Time Difference (E-OTD) technology, which utilizes measurements taken at the mobile terminal 100 of signals sent from several base stations. GPS-based technologies may include Assisted-GPS, which utilizes information about the current status of the GPS satellites derived independently of the mobile terminal 100 to aid in the determination of the terminal's location.

Figure 2:
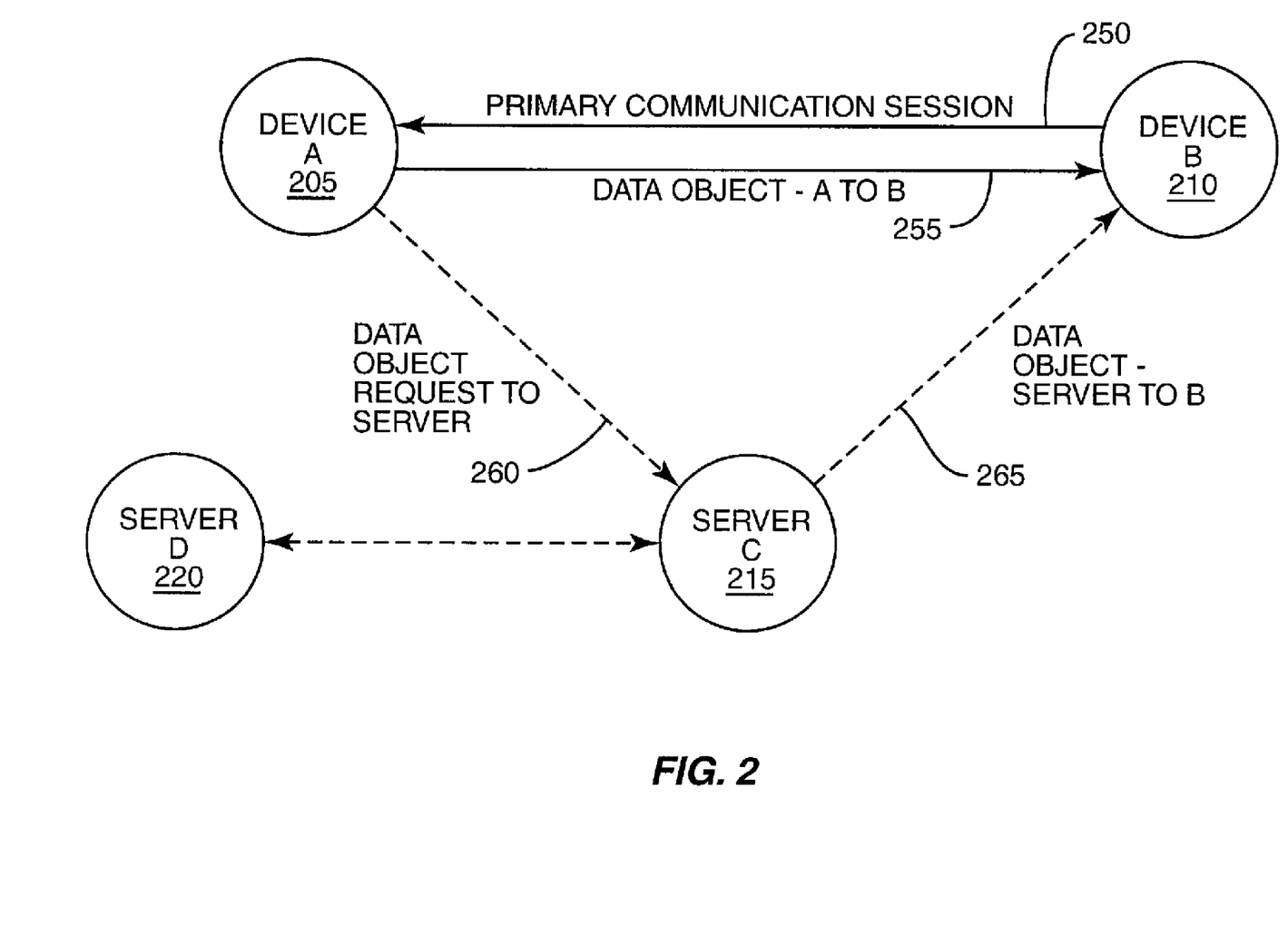
FIG. 2 illustrates an exemplary system for transferring data objects between communication devices in a communications system.

FIG. 2 presents a simplified view of a system 200 for selectively transferring confidential or private information to or between communication devices. (Although the terms "private" and "confidential" may have somewhat different connotations in certain contexts, the terms are used interchangeably herein to generally refer to information over which a user wishes to retain control, e.g., non-public information.) System 200 includes a first communication device A 205, a second communication device B 210, a data object server C 215, and an external server D 220. In some embodiments, communication devices A 205 and B 210 may comprise any of the end user devices described herein, such as, for example, communication device 100 of FIG. 1, and data object server 215 may comprise any of the servers described herein, such as server 150 or server 180 of FIG. 1.

In some embodiments, the various systems and methods described herein may enable the users of communication devices A 205 and B 210—upon the occurrence of a trigger event, for example—to transmit and receive data objects between them. These data objects may comprise digital audio, digital images, video clips, text, or the like. In some embodiments, the data objects may be specifically related to various events occurring during a communication session between devices A 205 and B 210, such as the Phone Pages described in the earlier-referenced patents and patent applications. These triggering events may include, for example, the initial establishment of a voice call or other communication session, or a change in communication status, such as a caller being placed on hold, or the arrival or departure of another party to a multi-party communication session. Other trigger events might include, but are not limited to:

An outgoing call is or is about to be initiated.
A called party answers a call.
A called party is busy.
A called party does not answer after a pre-determined time or number of rings.
A called party rejects a call.
A called party is unavailable (e.g., an addressed mobile phone is out of coverage).
An incoming call is imminent or has just begun.
A conference call is or is about to be initiated.
A call is disconnected.
A party is placed on hold.
The location of a party has changed.
A communication device is switched on or off.
A special-function button is pressed on a communication device.
A button or other user interface device is activated in response to a query.
A voice mail, text message, e-mail, instant message, or the like is received.
A voice mail, text message, e-mail, instant message, or the like is received.

While many of the preceding trigger events are related to traditional voice communications, those skilled in the art will appreciate that many analogous trigger events will apply to other communication modes, such as instant messaging, e-mail, video conferencing, "chat" sessions, and so on.

In some embodiments, the data objects may comprise private or confidential data or information that may be of interest to the users of communication devices A 205 and B 210, or any other data or information that may be transmitted via data objects or phone pages. In some cases, particular private or confidential data may only be relevant in the event that one or more particular trigger events have occurred. In any case, the data objects, or the constituent data to be used in forming data objects, may be stored within a communication device or within a remote server, database or other storage device.

As shown in FIG. 2, the users of communication devices A 205 and B 210 are engaged in a primary communication session 250. Primary communication session 250 may comprise a voice call (e.g., circuit-switched or VoIP), instant message (IM) session, or any other modes of communication such as those described herein or combinations thereof. In some embodiments, communication device A 205 and communication device B 210 may each include a module or application that is able to determine data or information of interest to the users thereof, such as, for example, location information of one of the communication devices, or any data or information that may be private. In some circumstances, this private information may be particularly relevant to the primary communication session 250 between the users of communication device A 205 and communication device B 210. The data or information may be identified or determined either verbally, autonomously or with the assistance another entity attached to the communication network, such as, for example, a location server, or a database (e.g., the Phone Pages database). In some embodiments, such data or information may be transmitted and received via data objects.

For example, during a session between communication device A 205 and communication device B 210, the users may decide that private information such as the current location of one of the communication devices needs to be shared to enhance the conversation, complete a desired transaction, or simply get directions. For example, two people talking on a session who wish to meet might need location information for each other, and perhaps directions. In some embodiments, however, such information may generally be regarded as private and may only be shared after consent of the data's owner is sought and received. Thus, the systems and methods described herein enable the request and/or giving of consent so that otherwise private information can be transmitted as described herein. In addition to location information, private information may also comprise information regarding private banking information, personal data, or any other information considered to be valuable to either party.

In some embodiments, during the primary communication session 250 with communication device B 210, a triggering event may occur at communication device A 205. Such trigger may occur, for example, upon the occurrence of any of the following events or combinations thereof:

Completing establishment of the session with user B;
Being in a specific location that user A has associated with particular private or personal data. (While in New Orleans I like Jazz music, while in Seattle I like grunge music, etc.);
User A manually activates a button or other user interface device (explicit request);
Any other trigger events, such as those described above or in U.S. Pat. No. 6,996,072.

In some embodiments, in response to the trigger event, an application in communication device A 205 may directly send—or transmit a request to data object server C 215 for it to send—a data object to communication device B 210 containing private data or information related to session between communication device A 205 and communication device B 210. A transfer directly between devices A 205 and B 210 is shown as data object transfer 255 in FIG. 2. A process using server C 215 as an intermediary is also shown: a data object request to server is shown at 260 and the resulting transfer of a data object to device B 210 is shown at 265. In some embodiments, the request to data object server C 215 may include the identity of communication device B 210 and the private data or information related to session between communication device A 205 and communication device B 210. Those skilled in the art will appreciate that conventional means for communicating the request from the communication device A 205 to the data object server C 215; in some embodiments, for instance, the request may comprise an HTTP POST message, although, of course, protocols other than HTTP may be employed.

In some embodiments, however, before the data object containing private data or information is transferred, consent needs to be obtained from the user who might be compromised by disclosure of the private data or information. In some embodiments, such consent may be provided in response to an express query, while in some embodiments, consent is deemed granted upon the occurrence of a specified event or act.

The following interaction, illustrating an electronically-assisted sales transaction, demonstrates one embodiment of how consent may be achieved or obtained according to the systems and methods described herein. The user of communication device A 205 initiates a primary communication session 250 with the user of communication device B 210. The initiation of communication session 250 may constitute a first trigger event. This first trigger event may then lead to the sharing (i.e., transmission of a data object from communication device B 210 to communication device A 205) of non-confidential information, such as the image of an object that the user of communication device B 210 is selling and the price of the object. Communication device B 210 may respond directly to the trigger event, sending an image pre-stored in communication device B 210, or it may send a request to data object server 215 so that data object server 215 sends the appropriate data object to communication device A 210.

In addition to an image of the object for sale, the data object may include parameters translated into control buttons by the communication device A 205 user interface, so that the user of communication device A 205 may accept or reject the price offered by the user of communication device B 210. In this example, should the user of communication device A 205 reject the price (by selecting the appropriate control button, for example, thus triggering the generation of a rejection message to device B 210), then the user of communication device B 210 may choose to update the data object with a new price if he wishes to. This updated data object may then be transmitted to the user of communication device A 205. Those skilled in the art will appreciate that this updating process may be automated, so that communication device B 210 automatically responds to the price rejection trigger. Alternatively, the updated data object trigger may be sent in response to a manual trigger activated by the user of communication device B 210.

The preceding process may be repeated until such time as the user of communication device A 205 agrees to purchase the item. In some embodiments, once agreement is reached, the user(s) of communication device A 205 and/or B 210 may be asked for consent to disclose private data or information, such as each user's respective location information, to the other. Alternatively, in some embodiments, mere acceptance of an offered price by the user of communication device A 205 may constitute consent for his or her sharing location information. Once consent is obtained, the corresponding location information is sent from the communication device A 205 to communication device B 210, and vice-versa. When received, each communication device may then use this information to create a map, or get turn-by-turn directions, either on its own or by interacting with an appropriate server that can provide or generate such information. In some embodiments, the information may be sent to data object server 215 or an external server 220, either of which may generate a query to a standard mapping service and return a map object to either or both parties so they can meet.

In some embodiments, the functionality described herein may utilize multiple cascading data objects and a decision tree that leads to the correct behavior. For example, a decision tree can be created that specifies appropriate actions based on certain conditions or events, including one or more of the trigger events described above. Thus, referring to the above hypothetical, a decision tree can specify particular data objects to present in based on responses from the user of communication device A 205. If the user accepts the initial price, for example, the decision tree may present a first data object, whereas another data object (with a modified price, for example) would be presented if the user rejected the initial price. In some embodiments, preparation and administration of decision trees, cascading phone pages, and related functionality could be the function of the data object server 215, the communication device 210, or some other external device.

In some embodiments, a trigger event may trigger a push or pull of a data object automatically, or it may trigger a request for permission before executing the push or pull of a data object, depending on the prior conditions on use of the data object. For example, in the above location information hypothetical, a user may demand or specify that his location data object not be sent without an explicit permission granted to the data object server in each instance. Other rules, parameters and presumptions for transferring data objects and receiving or acknowledging consent are of course possible. In some embodiments, one or more parameters may be included in or associated with a stored data object, or may be included in or associated with one or more data items that may be used in forming a data object. In these embodiments, a communication device or data object server may inspect the data object or data item to determine whether the data object contains private or confidential information. For instance, a simple one-bit flag may indicate that a particular data object may not be transmitted to a second communication device without the consent of a user of the first communication device.

Figure 3:
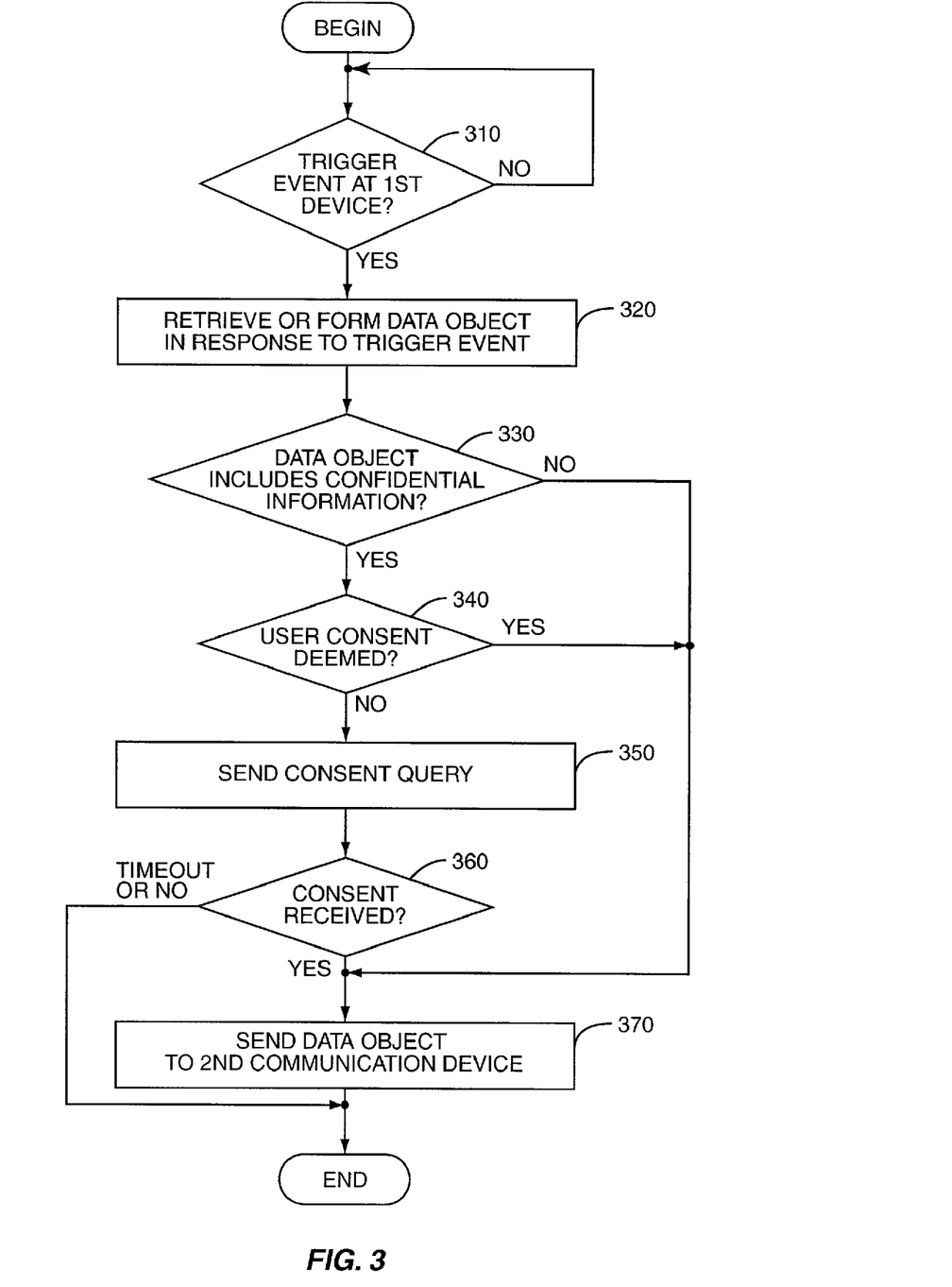
FIG. 3 is a logic flow diagram according to one or more embodiments of the present invention.

FIG. 3 illustrates an embodiment of an exemplary method for selectively transferring confidential or private information to a user of a communication device. The illustrated method may be implemented either at a first communication device, such as communication device A 205 of FIG. 2, or at a data object server, such as server C 215 of FIG. 2, as will be explained more fully below.

In either case, the illustrated method begins with the monitoring for a trigger event at a first communications device. As explained above, this trigger event may be any of a wide variety of events related to a communications session or transaction between the first communication device and a second communication device. If the method is implemented on the first communication device, the trigger events are of course detected directly. If, on the other hand, the pictured method is implemented at a server, detection of a trigger event may comprise the receipt of a message from the communication device.

In either case, upon the detection of a trigger event at block 310, a data object is formed or retrieved in response to the trigger event, as shown at block 320. In some embodiments, a data object may be selected from a plurality of data objects stored in a database, using the trigger event type and/or identifiers associated with the first or second communication devices as selection parameters. In some embodiments, a data object may be assembled from two or more component data items, again with the trigger event type and/or device identifiers used as parameters for selecting which data items to use in forming the data object. If the method of FIG. 3 is implemented at the first communication device, then retrieving or forming the data object may comprise sending a data object request to a data object server. In these embodiments, the data object request may include parameters indicating the trigger event type as well as identifiers associated with the first and/or second devices, for use by the data object server in selecting or assembling a data object to be returned to the first communication device.

As discussed above, some data objects might include confidential information that should not be forwarded to the second communication device without the consent of the user of the first device. Thus, at block 330, the confidentiality of the data object is checked. In some embodiments, this checking process may comprise evaluating a confidentiality datum, or indicator, included in or associated with the data object; in others, the confidentiality may be determined by evaluating the types of data included in the data object. For example, some data included in the data object might be identified as financial data; in some embodiments all financial data may be treated as confidential. In other embodiments, determining whether the data object includes private or confidential information may comprise sending a query to the first communication device user, and evaluating the response.

If the data object does not include confidential information, then the data object is forwarded to the second communication device, as shown at block 370. If the data object does include confidential information, on the other hand, then the data object is not forwarded unless user consent is obtained. In some cases, user consent may be deemed, based on, for example, prior actions taken by the user or a prior sequence of events. For instance, user consent might be deemed in the financial transaction described earlier based on the user's acceptance of a price offer. The conditions for whether user consent is deemed or not, if any, are thus evaluated as shown at block 340. Those skilled in the art will appreciate that those conditions may vary according to the precise contents of the data object, so that consent may be deemed for some data objects but not for others, even given the same user actions or prior sequence of events.

In some embodiments, the conditions under which consent should be deemed may be characterized in a pre-determined consent profile for the user of the first communication device. This consent profile, which may typically be edited by the user, may include various conditions under which consent should be deemed. These conditions may include, by way of non-limiting example, customizable details with respect to data object type (e.g., location information, financial information) and/or device identifiers. Thus, for instance, the device user may include in his consent profile information indicating that all information may be shared with certain devices, but only limited information may be shared with others. As those skilled in the art will appreciate, the consent profile may include other details for use in evaluating whether consent should be deemed.

If user consent is not deemed, then a consent query is sent to the user, as shown at block 350. Generally speaking, this comprises the generation of a query for display at the user interface of the communication device. In embodiments implemented at a data object server, this step may further comprise the transmission of a query message from the data object server to the first communication device. In either case, the user may be provided with a description of the confidential information and options for consenting or not to transfer of the data object to the second communication device.

If consent is received, at block 360, then the data object is sent to the second communication device, at block 370. If not, or if the request is not acknowledged in a pre-determined time, then the data object is not sent. As will be appreciated by those skilled in the art, the data object may be forwarded to the second communication device by a variety of methods. In some cases, the method employed may vary depending on the type or size of the data object. Some of these methods may include a Short Message Service (SMS), a Multimedia Message Service (MMS), e-mail, Instant Message (IM), or the like. Additional methods and/or protocols may be used as well. The data object may in some instances be sent as part of the original communications session between the first and second communication device, or via a separate session or transaction. As will be appreciated by those skilled in the art, the data object may be sent from the first communication device to the second communication device, or from a data object server to the second communication device, on behalf of the first device.

Figure 4:
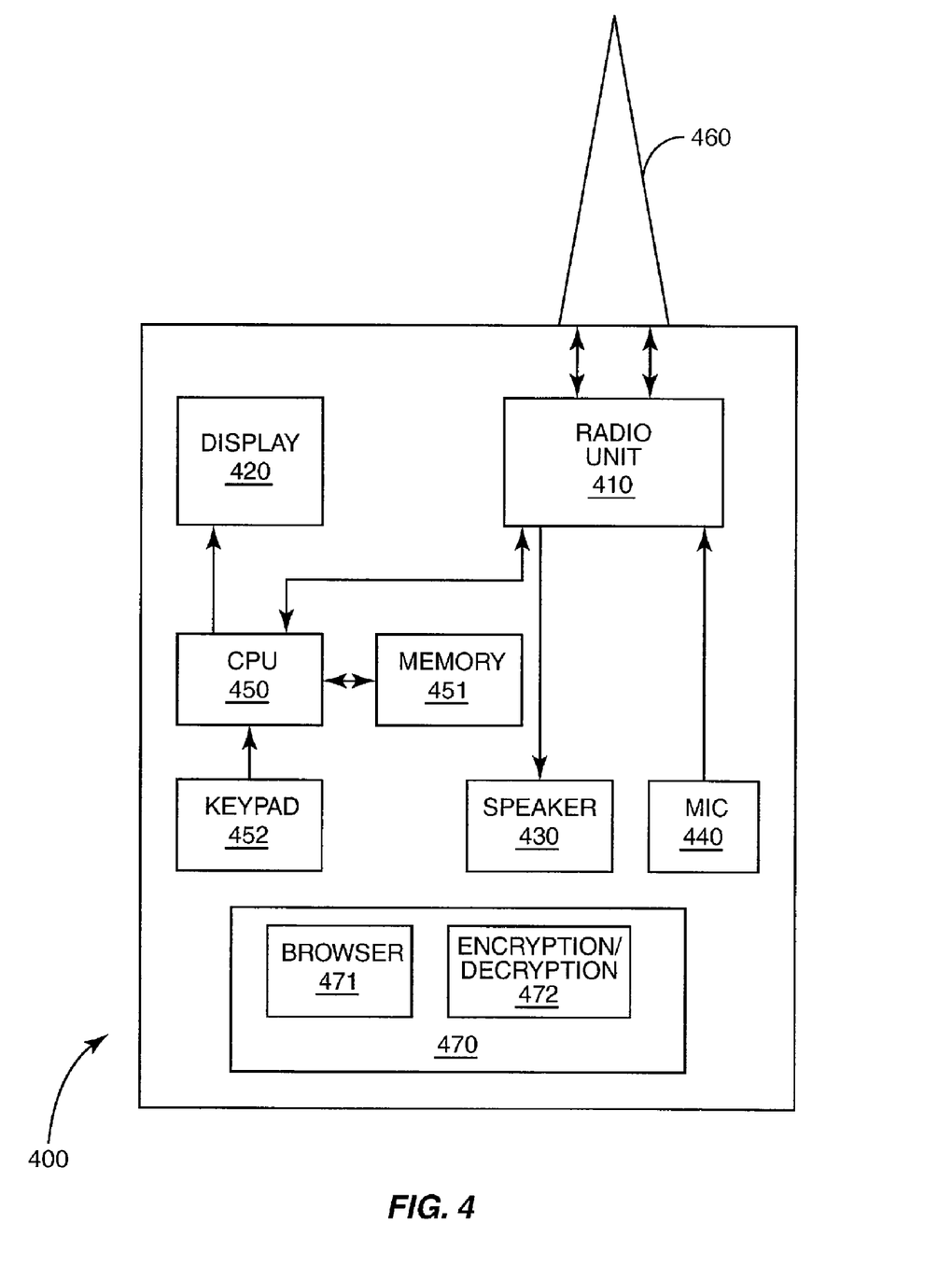
FIG. 4 is a block diagram illustrating an exemplary communication device.

FIG. 4 illustrates an exemplary communication device 400 to be used in one embodiment of the present invention. In the pictured embodiment, communication device 400 may comprise a mobile telephone, or a personal digital assistance (PDA) device with mobile telephone capabilities. Communication device 400 includes a central processing unit (CPU) 450, connected to at least one memory unit 451, and at least one display 420. The CPU 450 may also be connected to a keyboard device or area 452 to allow subscribers to enter, for example, digits or alphanumeric characters. The memory unit 451 may include non-volatile memory (e.g., flash, EEPROM or SIM card) in order to retain stored information, should power be temporarily unavailable.

The CPU 450 is further connected to a radio unit 410 configured to convert incoming and outgoing data to and from radio frequency (RF) modulated signals. The radio unit 410 also connects to an antenna 460 for transmission and reception of the RF signals. Radio unit 410 may also directly or indirectly be connected to an earphone 430 and a microphone 440 in order to allow voice communication. Communication device 400 may further comprise a plurality of programs 470, such as a browser 471, that can render at least one type of data object, and an encryption/decryption engine 472, allowing data object requests to be encrypted and data objects to be decrypted. Communication device 400 may optionally be equipped with a cache memory in which it is possible to store and retrieve data objects without occupying transmission resources within the communication network.

In some embodiments of the present invention, CPU 450 and/or other processing logic included in communication device 400 is configured to carry out one or more of the methods described above. In particular, communication device 400 may comprise processing logic configured to detect the occurrence of a trigger event, the trigger event related to communication between device 400 and a second communication device. In response to the trigger event, the processing logic is configured to retrieve or form a data object; in some embodiments this comprises requesting a data object from a remote data object server and receiving the data object in response. The processing logic may be further configured to determine whether the data object includes private or confidential information; if so, the processing logic determines whether a user of the first communication device has consented to transfer of the data object to the second communication device. In some embodiments, this may comprise requesting express consent from the user. Upon receiving consent (or, in some embodiments, upon deeming consent), the processing logic is configured to forward the data object to the second communication device. In some embodiments, this may comprise transmitting the data object to the second communication device via radio unit 410.

Figure 5:
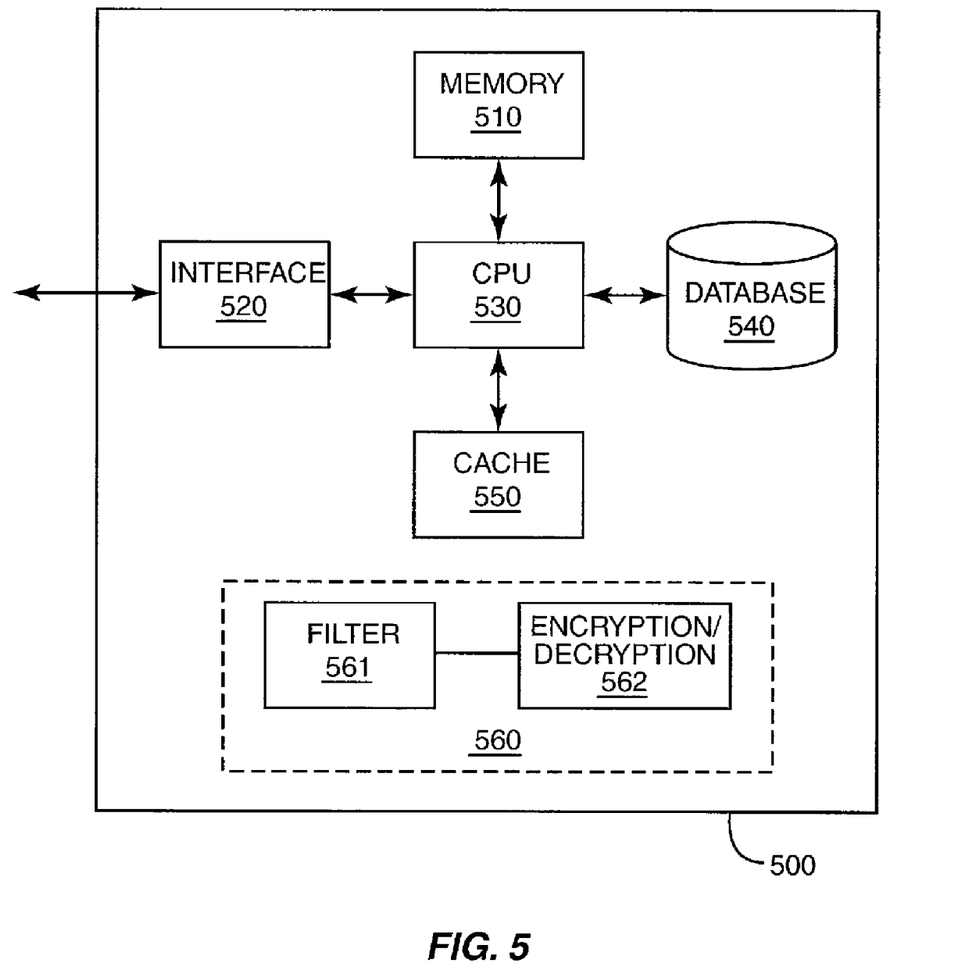
FIG. 5 is a block diagram illustrating an exemplary data object server.

FIG. 5 illustrates an exemplary data object server 500, according to one or more embodiments of the present invention. Data object server 500 comprises at least one CPU 530 connected to at least one memory device 510, a cache memory 550, at least one database 540 and at least one network interface 520. Memory devices 510 and databases 540 may include non-volatile memory, such as flash, magnetic, or optical storage devices. Network interface 520 enables the CPU 530 to send and receive data to/from the data network 130. The cache memory 550 allows storage of frequently used data objects so that the CPU 530 may obtain them readily. The database 540 contains the actual data objects that can be requested by a communication device, such as communication device 400, via, for example, the wireless network 120 and Internet 130 pictured in FIG. 1. The data object server may further comprise a number of programs 560 including, but not limited to, a filter 561, allowing the data objects to be optimized according to the rendering capabilities of the communication device 400, and an encryption/decryption engine 562, allowing data object requests to be decrypted and data objects to be encrypted.

In some embodiments of the present invention, the data object server 500 is configured to carry out one or more of the methods described above. In particular, data object server 500 may comprise processing logic (e.g., CPU 530, configured with appropriate software) configured to detect the occurrence of a trigger event associated with communication between a first and second communication device. In some embodiments, the trigger event is detected by the receipt of a trigger event message from the first communication device. In response to the trigger event/trigger event message, the data object server is configured to retrieve or form a data object. In some embodiments, this comprises retrieving the data object from database 540 or cache 550; in other embodiments or circumstances this may comprise requesting a data object from a remote data object server and receiving the data object in response. The data object server 500 may be further configured to determine whether the data object includes private or confidential information; if so, the data object server 500 determines whether a user of the first communication device has consented to transfer of the data object to the second communication device. In some embodiments, this may comprise requesting express consent from the user by sending a consent query to the first communication device. Upon receiving consent, such as a response to the consent query (or, in some embodiments, upon deeming consent), the data object server 500 is configured to forward the data object to the second communication device, via network interface 520.

Those skilled in the art will appreciate that the various functions of communication device 400 and data object server 500 may be performed using various combinations of hardware and software. Accordingly, each of the described processing blocks may in some embodiments directly correspond to one or more commercially available or custom microprocessors, microcontrollers, or digital signal processors. In other embodiments, however, two or more of the processing blocks or functional elements of device 400 or data object server 500 may be implemented on a single processor, while functions of other blocks are split between two or more processors. Likewise, memories 451 and 510 are representative of the one or more memory devices containing the software, firmware, and data used to implement base station functionality in accordance with one or more embodiments of the present invention. Thus, these memory devices may include, but are not limited to, the following types of devices: cache, ROM, PROM, EPROM, EEPROM, flash, SRAM, and DRAM.

Those skilled in the art should appreciate that the present invention broadly provides methods and apparatus for selectively transferring confidential or private information to a user of a communication device. The present invention may, of course, be carried out in other specific ways than those herein set forth without departing from the scope and essential characteristics of the invention. Thus, the present invention is not limited to the features and advantages detailed in the foregoing description, nor is it limited by the accompanying drawings. Indeed, the present invention is limited only by the following claims, and their legal equivalents.

What is claimed is:

1. A method for selectively transferring private information to a user of a communication device, comprising:
    detecting an occurrence of a trigger event at a first mobile terminal;
    retrieving or forming a data object at the first mobile terminal, in response to the trigger event;
    determining whether the data object that was retrieved or formed in response to the trigger event includes private information;
    determining whether a user of the first mobile terminal has consented to transfer of the data object, if the data object includes private information;
    sending the data object from the first mobile terminal to a second mobile terminal, responsive to the trigger event, if the user of the first mobile terminal has consented or if the data object does not include private information.

2. The method of claim 1, wherein retrieving or forming a data object in response to the trigger event comprises requesting the data object from a data object server and receiving the data object in response to the request.

3. The method of claim 1, wherein determining whether the data object includes private information comprises inspecting the data object for a confidentiality indicator.

4. The method of claim 1, wherein determining whether the data object includes private information comprises providing a confidentiality query to the user of the first mobile terminal and evaluating a response, if any, to the confidentiality query.

5. The method of claim 4, wherein determining whether the user of the first mobile terminal has consented to transfer of the data object is based on the response to the confidentiality query.

6. The method of claim 1, wherein determining whether the user of the first mobile terminal has consented to transfer of the data object comprises evaluating a pre-determined consent profile for the user of the first mobile terminal.

7. The method of claim 1, wherein determining whether the user of the first mobile terminal has consented to transfer of the data object comprises providing a consent query to the user of the first mobile terminal and evaluating a response, if any, to the consent query.

8. The method of claim 1, wherein the trigger event indicates acceptance of an electronic sales offer by the user of the first mobile terminal and the data object comprises private financial information, and wherein determining whether the user has consented to transfer of the data object comprises deeming consent based on said indication of acceptance.

9. The method of claim 1 wherein the trigger event comprises an establishing of a communication session, a change in communication status, the expiration of a timer, or a manual activation of a device key by a user of the first mobile terminal.

10. A first mobile terminal configured for communication with a second mobile terminal, wherein the first mobile terminal comprises processing logic configured to:
    detect an occurrence of a trigger event at the first mobile terminal;
    retrieve or form a data object in response to the trigger event;
    determine whether the data object includes private information;
    determine whether a user of the first mobile terminal has consented to transfer of the data object, if the data object includes private information;
    send the data object to the second mobile terminal, responsive to the trigger event, if the user of the first mobile terminal has consented or if the data object does not include private information.

11. The first mobile terminal of claim 10, wherein the processing logic is configured to retrieve the data object by requesting the data object from a data object server and receiving the data object in response to the request.

12. The first mobile terminal of claim 10, wherein the processing logic is configured to form the data object by assembling the data object using one or more stored data items selected in view of the triggering event.

13. The first mobile terminal of claim 10, wherein the processing logic is configured to determine whether the data object includes private information by inspecting the data object for a confidentiality indicator.

14. The first mobile terminal of claim 10, wherein the processing logic is configured to determine whether the user of the first mobile terminal has consented to transfer of the first data object by evaluating a pre-determined consent profile for the user of the first mobile terminal.

15. The first mobile terminal of claim 10, wherein the processing logic is configured to determine whether the user of the first mobile terminal has consented to transfer of the data object by querying the user of the first mobile terminal and evaluating a response to the query.

* * * * *